(12) United States Patent
Luciani

(10) Patent No.: US 6,898,200 B1
(45) Date of Patent: May 24, 2005

(54) METHOD FOR IMPROVING SIGNALING EFFICIENCY AND PERFORMING SERVICE LOAD BALANCING IN A CONNECTION ORIENTED NETWORK

(75) Inventor: James V. Luciani, Concord, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/429,047

(22) Filed: Oct. 29, 1999

(51) Int. Cl.[7] .......................... H04L 12/28; H04L 12/56
(52) U.S. Cl. ...................... 370/400; 370/401; 370/475; 370/410; 709/238; 709/228
(58) Field of Search ................................. 370/410, 236, 370/351, 354, 356, 389, 475, 401, 230, 238, 352, 395, 400–407, 466, 469, 471, 395.54; 709/245, 202, 203, 227, 238, 220, 228; 395/200.58, 200.5, 200.62, 200.73

(56) References Cited

U.S. PATENT DOCUMENTS

| | | | | |
|---|---|---|---|---|
| 5,420,862 A | * | 5/1995 | Perlman ...................... | 370/401 |
| 5,828,844 A | * | 10/1998 | Civanlar et al. ............. | 709/228 |
| 5,835,725 A | * | 11/1998 | Chiang et al. ............... | 709/228 |
| 5,894,479 A | * | 4/1999 | Mohammed ................ | 370/401 |
| 5,996,021 A | * | 11/1999 | Civanlar et al. ............. | 709/238 |
| 6,009,102 A | * | 12/1999 | Horikawa et al. ........... | 370/401 |
| 6,021,263 A | * | 2/2000 | Kujoory et al. .............. | 709/232 |
| 6,047,329 A | * | 4/2000 | Horikawa et al. ........... | 709/238 |
| 6,061,739 A | * | 5/2000 | Reed et al. .................. | 709/245 |
| 6,178,171 B1 | * | 1/2001 | Alexander et al. ...... | 370/395.54 |
| 6,252,857 B1 | * | 6/2001 | Fendick et al. ............. | 370/254 |
| 6,253,230 B1 | * | 6/2001 | Couland et al. ............ | 709/203 |
| 6,381,638 B1 | * | 4/2002 | Mahler et al. .............. | 709/220 |
| 6,421,321 B1 | * | 7/2002 | Sakagawa et al. ........ | 370/238.1 |

FOREIGN PATENT DOCUMENTS

| | | |
|---|---|---|
| EP | 0 691 772 A | 1/1996 |
| WO | WO 99 37073 A | 7/1999 |

OTHER PUBLICATIONS

NBMA Next Hop Resolution Protocol (NHRP); RFC2332, IETF, Apr. 1998; Luciani et al.*

Luciani, J., et al., "NBMA Next Hop Resolution Protocol (NHRP)", IETF Network Working Group FRC, Apr. 1998, XP002238931, pp. 5–7.

Sun, H., et al., "Supporting IP on the ATM Networks: An Overview", Computer Communications, Elsevier Science Publishers, BV Amsterdam, NL, vol. 21, No. 11, Aug. 10, 1998, ISSN: 0140-3664, pp. 1020–1029.

* cited by examiner

Primary Examiner—Ajit Patel
(74) Attorney, Agent, or Firm—Blakely Sokoloff Taylor & Zafman

(57) ABSTRACT

A method for improving signaling efficiency and load balancing in a non-broadcast, multiple access network environment. The standard next hop resolution protocol (NHRP) essentially is extended to provide peer to peer, i.e., source station to destination station, communication regarding resource availability and internetwork layer address to NBMA subnetwork layer address resolution, rather than client-server communication between a source station and a server that communicates with the source station on behalf of the destination station, as is the case in standard NHRP.

17 Claims, 3 Drawing Sheets

*Figure 1 – PRIOR ART*

METHOD FOR IMPROVING SIGNALING EFFICIENCY AND PERFORMING SERVICE LOAD BALANCING IN A CONNECTION ORIENTED NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a method for resolving a request for information in a multiprotocol internetwork environment operating over Non-Broadcast Multiple Access (NBMA) subnetworks.

2. Description of the Related Art

The Next Hop Resolution Protocol (NHRP) is described in Luciani, J., Katz, D., Piscitello, D., Cole, B., and Doraswamy, N., "NBMA Next Hop Resolution Protocol (NHRP)", IETF RFC 2332, April, 1998. With reference to FIG. 1, the NHRP allows a source station 110 (a node, host, switch, router, etc.) in a multiprotocol internetwork 100 to communicate with a destination station 130 over a Non-Broadcast, Multiple Access (NBMA) subnetwork 105. The NHRP provides source station 110 with the capability to determine the NBMA address of the NBMA next hop toward the destination station, through the exchange of NHRP resolution requests and resolution replies. As pointed out in RFC 2332, the NBMA subnetwork may be non-broadcast because it does not support broadcasting (e.g., an X.25 or ATM subnetwork) or broadcasting is not possible, for example, in the case of a Local Area Network (LAN) that supports a large number of stations. In FIG. 1, the NBMA next hop toward the destination station is router 120 since it is the closest router to destination station 130 and provides egress from the NBMA subnetwork. It should be noted that terms used herein to describe the present invention, such as internetwork layer, server, client, and station, are to be interpreted in a manner consistent with the definition and use of such terms as provided in RFC 2332.

In accordance with the NHRP, Next Hop Servers (NHSs) are provided in the NBMA subnetwork which are capable of responding to NHRP resolution requests. In FIG. 1, egress router 125 also functions as a NHS, and serves one or more destination stations, such as destination station 130. Likewise, ingress router 115 must function as a NHS for station 110.

An NHS builds and maintains a data structure that contains internetwork layer address (e.g., an Internet Protocol address) to NBMA subnetwork layer address resolution information. The table may be built and managed in accordance with techniques known to those of ordinary skill in the related arts. For example, a station may send a NHRP registration request to a NHS serving the station. The NHRP registration request contains internetwork layer address to NBMA subnetwork layer address resolution information that is then stored in the table maintained by the NHS.

A station that is a client of the NHRP service is known as a NHRP Client, or simply NHC. The NHS with which a NHC communicates to provide NBMA next hop information is the serving NHS for the NHC. In FIG. 1, NHS 115 serves station (NHC) 110, and NHS 125 serves station (NHC) 130 in most cases. For a serving NHS to supply address resolution information to a NHC, a continuous link of NHSs must exist along a path in the NBMA subnetwork between the NHC making the NHRP resolution request and the destination NHC, e.g., NHSs 115, 120 and 125. In accordance with RFC 2332, the last NHS along the path within the NBMA subnetwork is the serving NHS. That is, NHRP resolution requests are not forwarded to destination station/NHCs but are processed by the serving NHS. However, each NHC also maintains a table of internetwork layer address to NBMA address resolution information that it obtains from NHRP resolution replies, manual configuration, or through mechanisms outside the scope of the NHRP. Destination NHCs may be constrained on resource (e.g., SAR VPI/VCIs), and there is no existing mechanism to communicate that fact to the serving NHS which would normally reply to a resolution request on behalf of the NHC. Thus, the only way that a source station would find that out would be to attempt a connection setup and fail which is time consuming and resource intensive. By allowing the destination NHC to reply for itself, since it is in the best situation to know whether it has resource enough for the connection, signaling efficiency is gained since no additional connection setup attempt will be tried by the source station. Moreover, in the situation where multiple NHCs register with a given serving NHS for the same set of NBMA subnetwork addresses (e.g., for the same set of ATM attached servers/services), the NHS may perform service load balancing by forwarding the resolution request to a particular NHC and if that NHC then NAKs the resolution request, the serving NHS may offer the request to another NHC which is not currently busy. Further the NHS may choose to offer the request in some scheduled fashion (e.g., round robining) to each of the appropriate NHCs in turn.

BRIEF SUMMARY OF THE INVENTION

A method is described for forwarding NHRP resolution requests directly to an NHC so that the NHC itself may respond to the NHRP resolution request with a NHRP resolution reply, rather than having the serving NHS reply to the resolution request on behalf of the NHC.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Described is a method providing for a NHC to respond to a NHRP resolution request. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Figure 1:
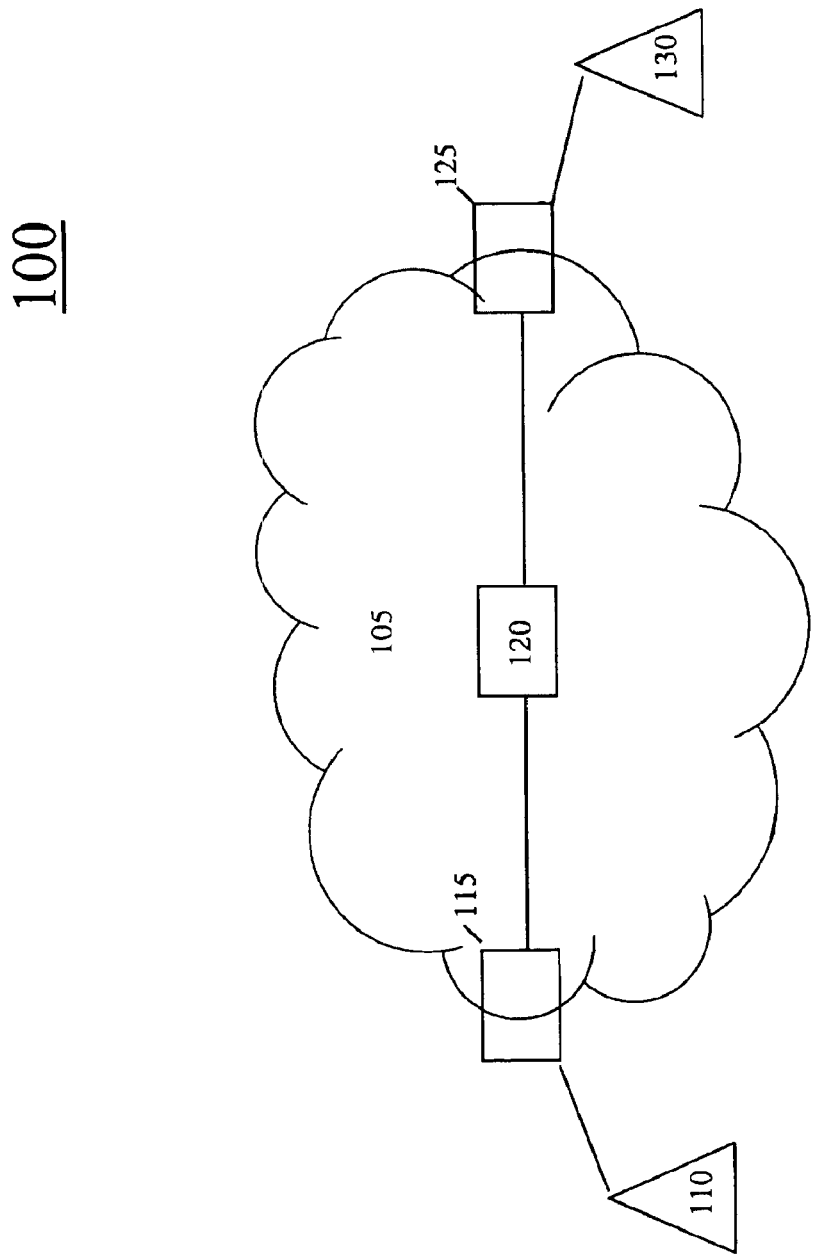
FIG. 1 is a prior art diagram of a multiprotocol internetwork environment operating over an NBMA subnetwork.
Figure 2:
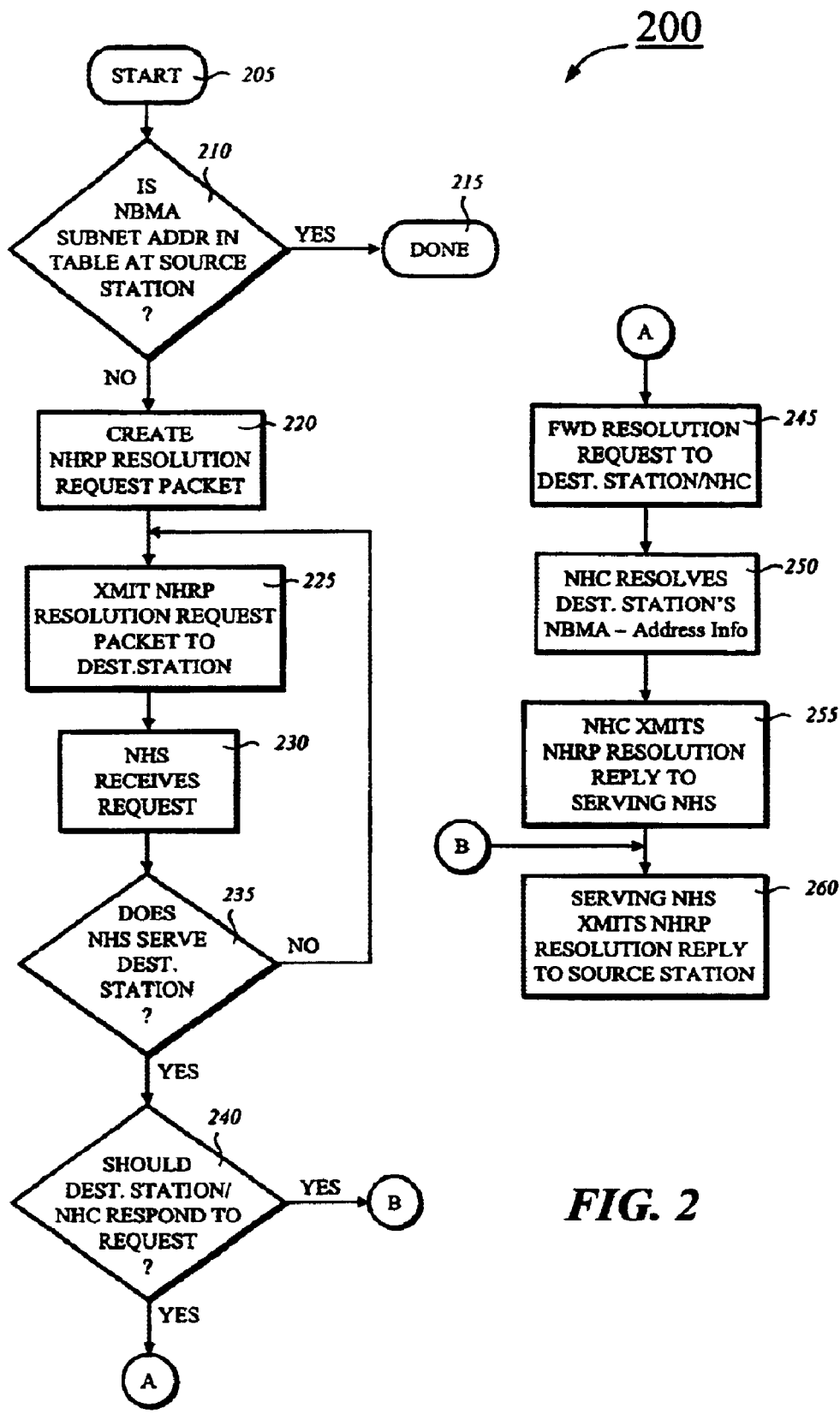
FIG. 2 illustrates an embodiment of the present invention.

With reference to FIG. 2, an embodiment of the present invention 200 proceeds as follows. The process starts as 205, wherein source station 110, given the internetwork layer address of destination station 130, seeks to resolve the NBMA subnetwork address of a path to station 130. At 210, if the NBMA subnetwork address information for the path to station 130 is already available in the address resolution table maintained at the source station, then that information is utilized by the source station in communicating with station 130 and the resolution process is done at 215. Otherwise, the source station creates at 220 a NHRP resolution request packet comprising the internetwork layer address of the destination station as the destination address, the internetwork layer address of the source station as the source address, and the NBMA subnetwork address information for the source station. Source station 110 then transmits the NHRP resolution request packet at 225 to the nearest NHS (i.e., ingress router 115) along the routed path of NHSs within the NBMA subnetwork 105, toward the destination station 130.

The NHS 115 receives the NHRP resolution request at 230, examines at 235 whether it serves destination station 130, and if not, forwards the resolution request at 225 to the next NHS in the routed path to destination station 130, in this case, intermediate NHS 120.

The process continues in this manner until NHS 125 receives and examines the destination internetwork address in the resolution request packet and determines at 235 that it serves destination station 130. NHS 125 then considers at 240 whether it should respond to the NHRP resolution request on behalf of its NHS, destination station 130, or whether it should forward the resolution request on to the destination station so that the destination station may respond directly to the resolution request. If the serving NHS determines it should reply to the resolution request on behalf of its NHC, destination station 130, then the serving NHS formulates, and transmits at 260, a positive NHRP resolution reply that resolves the NBMA address information for destination station 130 on the destination station's behalf. Otherwise, the serving NHS forwards the resolution request to the NHC at 245. The NHC resolves the destination station 130 NBMA address information at 250. In 255 the NHC transmits an NHRP resolution reply to the serving NHS. Then the serving NHS transmits the NHRP resolution reply to the source station. The NHRP resolution reply packet contains the address resolution information for the destination station and is sent back to the source station. It should be noted that if the destination station is not on the NBMA subnetwork, as is the case in multiprotocol internetwork 100, the next hop subnetwork layer address will be that of the egress router 125 through which packets addressed to the destination station are forwarded.

In determining at 240 whether the serving NHS or the NHC/destination station should respond to a NHRP resolution request, in one embodiment of the present invention, a destination station may inform its serving NHS that it wishes to directly reply to NHRP resolution requests received at the serving NHS from another station. One manner in which the NHC may inform the serving NHS of its wish to directly reply to NHRP resolution requests is to indicate via a unique time/length/value (TLV) extension to a NHRP registration request packet that it wishes to receive and respond to any NHRP resolution requests that the serving NHS receives, rather than allowing the serving NHS to respond to the resolution request on behalf of the NHC/destination station.

In another embodiment, different TLV values may be specified in a NHRP registration request sent from the NHC to the NHS to indicate certain situations under which it is applicable for or desired that the NHS forward NHRP resolution requests to the NHC. For example, the NHC may specify via the TLV extension part of a NHRP registration request packet certain resource constraints on the NHS during which time the NHS is to forward NHRP resolution requests about the NHC to the NHC rather than responding to the request on behalf of the NHC. Alternatively, a NHC may choose whether to reject or accept a NHRP resolution request forwarded to it from its serving NHS based on an agreed upon configuration, e.g., through manual (user) configuration, management signaling, etc, or via information obtained by another protocol, for example, via a routing protocol. Under these approaches, communication of such configuration via the TLV extension in a NHRP registration request packet is not necessary.

Figure 3:
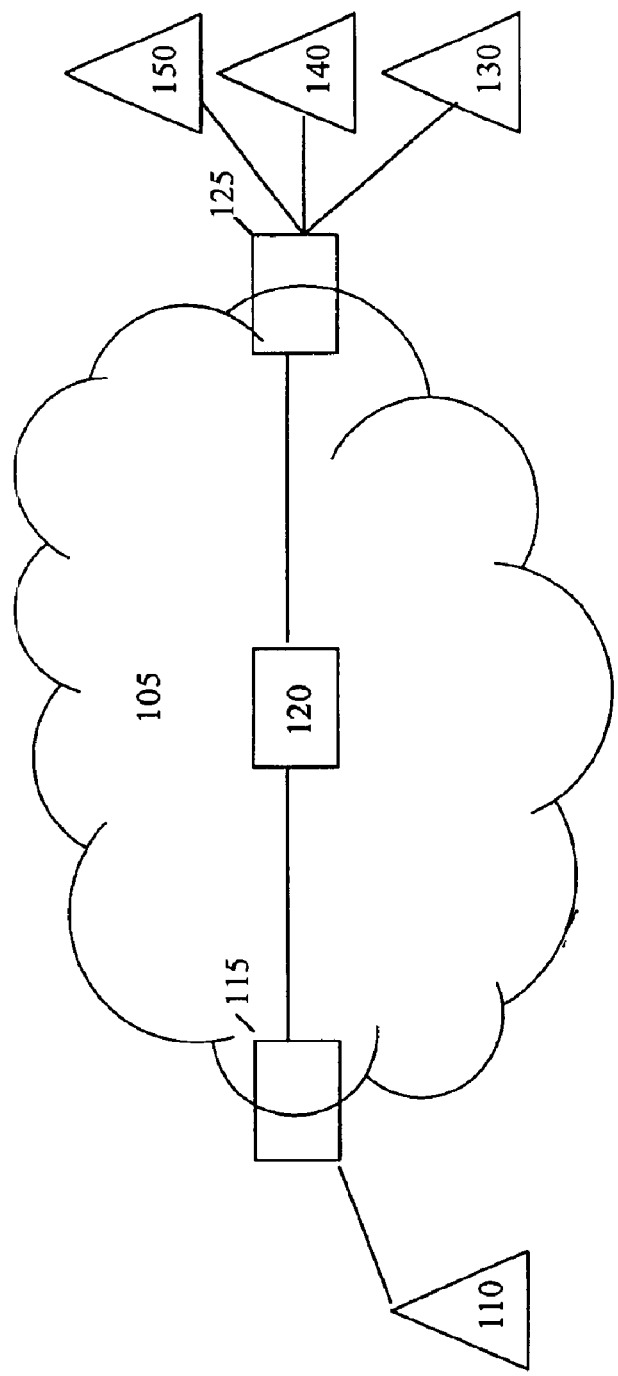
FIG. 3 illustrates a multiprotocol internetwork environment in which an embodiment of the present invention may be utilized.

With respect to FIG. 3, in yet another embodiment of the present invention, when multiple NHCs, e.g., stations 130, 140 and 150, transmit NHRP registration requests to the serving NHS 125 to register for the same destination address or set of destination addresses (e.g., for the same set of ATM attached servers/services), the NHS may perform load balancing by directing a NHRP resolution request to a certain one or more of the NHCs. The choice of which one or more of the NHCs to offer the request to and in what manner is a local matter. An appropriate NHC may be selected according to any one of a number of means. For example, a round robin, weighted round robin, or some other arbitration scheme may be employed to select the appropriate NHC to receive the NHRP resolution request. Moreover, the NHC selected may decide to accept or reject the NHRP resolution request based on certain criteria, such as resource availability, source address of the source station, or any other well known packet filtering technique. This approach often is advantageous given that a particular NHC generally is in a better position to determine if it is willing to receive communications from a source station than its serving NHS.

In the embodiment illustrated in FIG. 3, if a given NHC has indicated to its serving NHS that it is capable of receiving and responding directly to a NHRP resolution request, but nevertheless decides to reject a NHRP resolution request, then the serving NHS, upon receiving a negative NHRP resolution reply from the NHC, may elect to forward the NHRP resolution request on to another NHC that satisfies the request criteria. In this way, an improved load balancing capability and better set up connection signaling efficiency is achieved.

What is claimed is:

1. A method for communicating information in a network, comprising:

a) sending a request for information about a destination node from a source node to a server node that responds to such requests on behalf of the destination node comprises sending a Next Hop Resolution Protocol (NHRP) resolution request from a NHRP capable source node to a NHRP server node that responds to such requests on behalf of the destination node;

b) forwarding the request from the server node to the destination node;

c) sending a response to the request from the destination node to the server node; and d) forwarding the response from the server node to the source node.

2. The method of claim 1, wherein forwarding the request from the server node to the destination node comprises forwarding the NHRP resolution request from the NHRP server node to the destination node.

3. The method of claim 2, wherein sending a response to the request from the destination node to the server node comprises sending a NHRP resolution reply to the NHRP resolution request from the destination node to the NHRP server node.

4. The method of claim 3, wherein forwarding the response from the server node to the source node comprises forwarding the NHRP resolution reply from the NHRP server node to the NHRP capable source node.

5. A method for communucating internetwork layer address to subnetwork layer address resolution information between peer stations in a nonbroadcast, multiple access subnetwork, comprising:
   a) generating at a source station a next hop resolution protocol (NHRP) resolution request to obtain internetwork layer address to subnetwork layer address resolution information for a destination station, the NHRP resolution request specifying the internetwork layer address for the destination station;
   b) transmitting the NHRP resolution request to a next hop resolution protocol server (NHS) within the nonbroadcast multiple access subnetwork that serves the destination station;
   c) determining at the NHS to forward the NHRP resolution request to the destination station;
   d) generating at the destination station a NHRP resolution reply providing the internetwork layer address to NBMA subnetwork layer address resolution information;
   e) transmitting the NHRP resolution reply from the destination station to the NHS; and
   f) transmitting the NHRP resolution reply from the NHS to the source station.

6. The method of claim 5, wherein determining at the NHS to forward the NHRP resolution request to the destination station farther comprises determining that the destination station previously transmitted a NHRP registration request to the NHS requesting the NHS to forward any NHRP resolution request that specified the internetwork layer address for the destination station to the destination station.

7. The method of claim 6, wherein determining that the destination station previously transmitted a NHRP registration request to the NHS requesting the NHS to forward any NHRP resolution request that specified the internetwork layer address for the destination station to the destination station further comprises determining that the destination station previously transmitted a NHRP registration request to the NHS, the NHRP registration request specifying a unique time/length/value (TLV) extension value that the NHS recognized as requesting the NHS to forward any NHRP resolution request that specified the internetwork layer address for the destination station to the destination station.

8. The method of claim 5, wherein determining at the NHS to forward the NHRP resolution request to the destination station further comprises determining that the NHS was previously configured to request the NHS to forward any NHRP resolution request that specified the internetwork layer address for the destination station to the destination station.

9. The method of claim 5, wherein determining at the NHS to forward the NHRP resolution request to the destination station further comprises determining that the NHS previously received a communication via an internetworking protocol instructing the NHS to forward any NHRP resolution request that specified the internetwork layer address for the destination station to the destination station.

10. A method for communicating internetwork layer address to subnetwork layer address resolution information between peer stations in a nonbroadcast, multiple access subnetwork comprising:
    a) generating at a source station a next hop resolution protocol (NHRP) resolution request to obtain internetwork layer address to subnetwork layer address resolution information for a destination station, the NHRP resolution request specifying the internetwork layer address for the destination station;
    b) transmitting the NHRP resolution request to a next hop resolution protocol server (NHS) within the nonbroadcast multiple access subnetwork that serves the destination station;
    c) determining at the NHS to forward the NHRP resolution request to the destination station;
    d) determining at the destination station whether to receive or reject the NHRP resolution request forwarded from the NHS;
    e) generating at the designation station a NHRP resolution reply providing the internetwork layer address to NBMA subnetwork layer address resolution information if the destination station determined to receive the NHRP resolution request forwarded from the NHS;
    f) transmitting the NHRP resolution reply from the destination station to the NHS; and
    g) transmitting the NHRP resolution reply from the NHS to the source station.

11. The method of claim 10, wherein determining at the destination station whether to receive or reject the NHRP resolution request forwarded from the NHS comprises determining at the destination station whether to receive or reject the NHRP resolution request forwarded from the NHS based on management signaling.

12. The method of claim 10, wherein determining at the destination station whether to receive or reject the NHRP resolution request forwarded from the NHS comprises determining at the destination station whether to receive or reject the NHRP resolution request forwarded from the NHS based on user configuration.

13. An article of manufacture comprising a computer readable medium having computer readable program code means embodied thereon for communicating internetwork layer address to subnetwork layer address resolution information between peer stations in a nonbroadcast, multiple access subnetwork, comprising:
    computer readable program code means at a next hop resolution protocol server (NHS) within the nonbroadcast multiple access subnetwork that serves a destination station, the computer readable program code means receiving a next hop resolution protocol (NHRP) resolution request from a source station to obtain internetwork layer address to subnetwork layer address resolution information for a destination station, the NHRP resolution request specifying the internetwork layer address for the destination station;
    computer readable program code means for determining at the NHS to forward the NHRP resolution request to the destination station;
    computer readable program code means at the NHS for receiving from the destination station a NHRP resolution reply providing the internetwork layer address to NBMA subnetwork layer address resolution information; and computer readable program code means at the NHS for transmitting the NHRP resolution reply from the NHS to the source station.

14. A method for communicating internetwork layer address to subnetwork layer address resolution information in a nonbroadcast, multiple access subnetwork, comprising:
   a) generating at a source station a next hop resolution protocol (NHRP) resolution request to obtain internetwork layer address to subnetwork layer address resolution information for a destination station, the NHRP resolution request specifying an internetwork layer address for the destination station;
   b) transmitting the NHRP resolution request to a next hop resolution protocol server (NHS) within the nonbroadcast multiple access subnetwork that serves a plurality of destination stations sharing the internetwork layer address;
   c) determining at the NHS to forward the NHRP resolution request to a one of the plurality of destination stations according to an arbitration scheme;
   d) generating at the one of the plurality of destination stations a NHRP resolution reply providing the internetwork layer address to NBMA subnetwork layer address resolution information;
   e) transmitting the NHRP resolution reply from the one of the plurality of destination stations to the NHS; and
   f) transmitting the NHRP resolution reply from the NHS to the source station.

15. A method of communicating internetwork layer address to subnetwork layer address resolution information, comprising:
   a) generating at a source station a next hop resolution protocol (NHRP) resolution request to obtain internetwork layer address to subnetwork layer address resolution information for a destination station, the NHRP resolution request specifying an internetwork layer address for the destination station;
   b) transmitting the NHRP resolution request to a next hop resolution protocol server (NHS) within the nonbroadcast multiple access subnetwork that serves a plurality of destination stations sharing the internetwork layer address;
   c) determining at the NHS to forward the NHRP resolution request to one of the plurality of destination stations according to an arbitration scheme;
   d) generating at the one of the plurality of destination stations one of: a NHRP resolution reply providing the internetwork layer address to NBMA subnetwork layer address resolution information; and a negative NHRP resolution reply that fails to provide the internetwork layer address to NBMA subnetwork layer address resolution information;
   e) transmitting the NHRP resolution reply from the one of the plurality of destination stations to the NHS;
   f) repeating c through e until one of: the NHRP resolution reply provides the internetwork layer address to NBMA subnetwork layer address resolution information; and the last of the one of the plurality of destination stations transmits the NHRP resolution reply to the NHS; and
   f) transmitting the NHRP resolution reply from the NHS to the source station.

16. An article of manufacture comprising a computer readable medium having computer readable program code means embodied thereon for communicating internetwork layer address to subnetwork layer address resolution information, comprising:
   computer readable program code means for generating at a source station a next hop resolution protocol (NHRP) resolution request to obtain internetwork layer address to subnetwork layer address resolution information for a destination station, the NHRP resolution request specifying an internetwork layer address for the destination station;
   computer readable program code means for transmitting the NHRP resolution request to a next hop resolution protocol server (NHS) within the nonbroadcast multiple access subnetwork that serves a plurality of destination stations sharing the internetwork layer address;
   computer readable program code means for determining at the NHS to forward the NHRP resolution request to a one of the plurality of destination stations according to an arbitration scheme;
   computer readable program code means for generating at the one of the plurality of destination stations a NHRP resolution reply providing the internetwork layer address to NBMA subnetwork layer address resolution information;
   computer readable program code means for transmitting the NHRP resolution reply from the one of the plurality of destination stations to the NHS; and
   computer readable program code means for transmitting the NHRP resolution reply from the NHS to the source station.

17. A method for communicating internetwork layer address to subnetwork layer address resolution information in a nonbroadcast, multiple access subnetwork, comprising:
   a) receiving at a next hop resolution protocol server (NHS) a next hop resolution protocol (NHRP) resolution request that was generated and transmitted by a source station to obtain internetwork layer address to subnetwork layer address resolution information for a destination station that is served by the NHS, the NHRP resolution request specifying the internetwork layer address for the destination station;
   b) determining at the NHS to forward the NHRP resolution request to the destination station;
   c) receiving an NHRP resolution reply providing the internetwork layer address to NBMA subnetwork layer address resolution information generated and transmitted by the destination station to the NHS; and
   d) transmitting the NHRP resolution reply from the NHS to the source station.

* * * * *